United States Patent
Matsuda et al.

(10) Patent No.: US 8,561,156 B2
(45) Date of Patent: Oct. 15, 2013

(54) SERVER APPARATUS, AND CONTROL METHOD AND COMPUTER-READABLE STORAGE MEDIUM THEREFOR

(75) Inventors: Araki Matsuda, Kawasaki (JP); Yosato Hitaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 13/116,645

(22) Filed: May 26, 2011

(65) Prior Publication Data

US 2011/0302639 A1 Dec. 8, 2011

(30) Foreign Application Priority Data

Jun. 7, 2010 (JP) ................................. 2010-130166

(51) Int. Cl.
*G06F 7/04* (2006.01)
(52) U.S. Cl.
USPC ............................................................ 726/6
(58) Field of Classification Search
USPC ........................ 726/5–7, 17, 28–30
See application file for complete search history.

(56) References Cited

U.S. PATENT DOCUMENTS

| | | | |
|---|---|---|---|
| 6,738,877 B1* | 5/2004 | Yamakawa et al. | 711/164 |
| 7,296,298 B2* | 11/2007 | Salgado | 726/30 |
| 7,552,467 B2* | 6/2009 | Lindsay | 726/5 |
| 7,765,600 B2* | 7/2010 | Saunders et al. | 726/27 |
| 8,291,472 B2* | 10/2012 | Bak et al. | 726/2 |
| 8,370,906 B2* | 2/2013 | Wen et al. | 726/4 |
| 2002/0091947 A1* | 7/2002 | Nakamura | 713/202 |
| 2004/0083395 A1* | 4/2004 | Blechman | 713/202 |

FOREIGN PATENT DOCUMENTS

JP 2006-309355 11/2006

* cited by examiner

*Primary Examiner* — Beemnet Dada
(74) *Attorney, Agent, or Firm* — Cowan, Liebowitz & Latman, P.C.

(57) ABSTRACT

A server apparatus capable of preventing unauthorized use of services by a third party through an electronic appliance that stores information used for user authentication by the server apparatus. The server apparatus receives, from an information processing apparatus, pieces of user identification information, pieces of appliance identification information, and pieces of use permission/prohibition information representing on a per service type basis whether uses of services are permitted or prohibited, and stores them so as to be associated with one another. When determining based on use permission/prohibition information, which is associated with a combination of user identification information and appliance identification information that are accepted from an electronic appliance, that use of a service represented by service type information accepted from the electronic appliance is permitted, the server apparatus transmits screen information for use of the service to the electronic appliance.

22 Claims, 14 Drawing Sheets

FIG.3

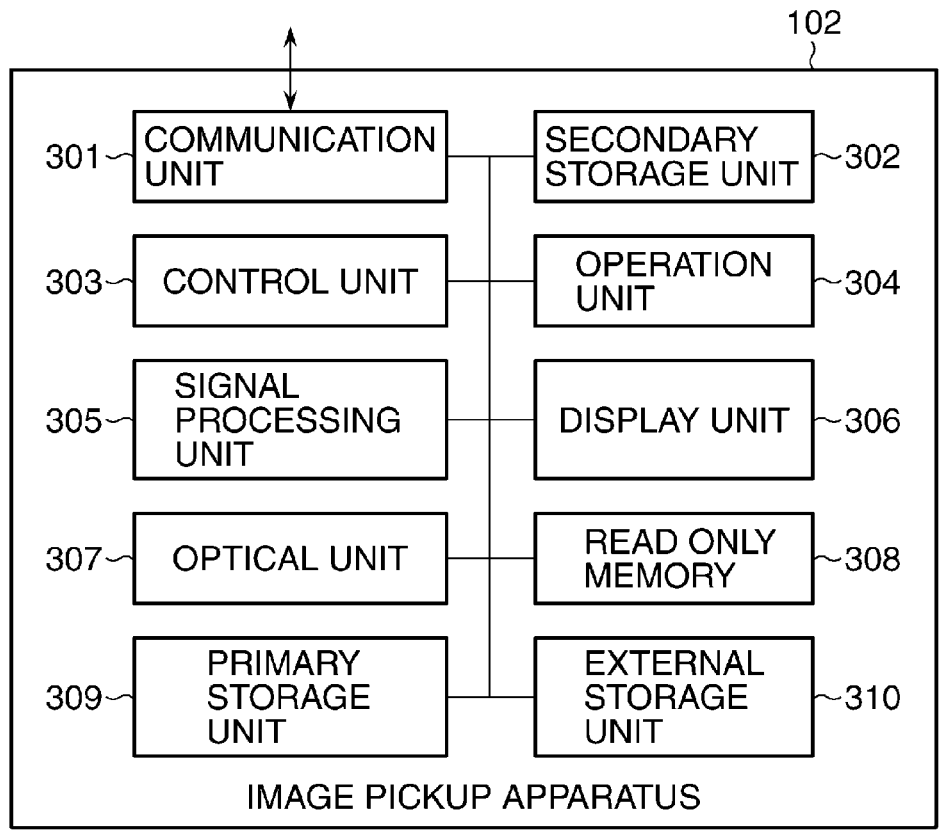

IMAGE PICKUP APPARATUS (102)

- 301 COMMUNICATION UNIT
- 302 SECONDARY STORAGE UNIT
- 303 CONTROL UNIT
- 304 OPERATION UNIT
- 305 SIGNAL PROCESSING UNIT
- 306 DISPLAY UNIT
- 307 OPTICAL UNIT
- 308 READ ONLY MEMORY
- 309 PRIMARY STORAGE UNIT
- 310 EXTERNAL STORAGE UNIT

FIG.4

| USER IDENTIFICATION INFORMATION | APPLIANCE IDENTIFICATION INFORMATION | USE PERMISSION / PROHIBITION INFORMATION |
|---|---|---|
| USER_A | ID_1 | PERMITTED |
| | ID_2 | PERMITTED |
| | ID_3 | PERMITTED |
| USER_C | ID_4 | PERMITTED |
| | ID_5 | PERMITTED |
| ⋮ | ⋮ | ⋮ |

FIG.9A

| USER IDENTIFICATION INFORMATION | APPLIANCE IDENTIFICATION INFORMATION | USE PERMISSION / PROHIBITION INFORMATION | |
|---|---|---|---|
| USER_A | ID_1 | ONLINE ALBUM | PERMITTED |
| | | PRINT ORDER | PERMITTED |
| | ID_2 | ONLINE ALBUM | PERMITTED |
| | | PRINT ORDER | PROHIBITED |
| USER_B | ID_3 | ONLINE ALBUM | PERMITTED |
| | | PRINT ORDER | PERMITTED |
| ⋮ | ⋮ | ⋮ | ⋮ |

FIG.9B

| USER IDENTIFICATION INFORMATION | APPLIANCE IDENTIFICATION INFORMATION | USE PERMISSION / PROHIBITION INFORMATION | |
|---|---|---|---|
| USER_A | ID_1 | ONLINE ALBUM | PERMITTED |
| | | PRINT ORDER | PERMITTED |
| | | ONLINE SHOPPING | PERMITTED |
| | ID_2 | ONLINE ALBUM | PERMITTED |
| | | PRINT ORDER | PERMITTED |
| | | ONLINE SHOPPING | PROHIBITED |
| ⋮ | ⋮ | ⋮ | ⋮ |

FIG.9C

| USER IDENTIFICATION INFORMATION | APPLIANCE IDENTIFICATION INFORMATION | USE PERMISSION / PROHIBITION INFORMATION | |
|---|---|---|---|
| USER_A | ID_1 | ONLINE ALBUM | PERMITTED |
| | | PRINT ORDER | PERMITTED |
| | | ONLINE SHOPPING | PERMITTED |
| | | PHOTO BOOK ORDER | PERMITTED |
| | ID_2 | ONLINE ALBUM | PERMITTED |
| | | PRINT ORDER | PERMITTED |
| | | ONLINE SHOPPING | PROHIBITED |
| | | PHOTO BOOK ORDER | PROHIBITED |
| ⋮ | ⋮ | ⋮ | ⋮ |

FIG.10A

| CATEGORY | CATEGORY A | CATEGORY B | CATEGORY C | CATEGORY D |
|---|---|---|---|---|
| 1001 | NEWS, ADVERTISING, PROMOTION | CONTENT BROWSING | PERSONAL INFORMATION, CONTENT UPDATE | PURCHASE, BILLING |
| | PRODUCT INFORMATION SERVICE | DOWNLOAD | UPLOAD | PRINT ORDER |
| SERVICE 1002 | NEWS BROWSING | ONLINE ALBUM BROWSING | ONLINE ALBUM UPDATE | ONLINE SHOPPING |
| | | | USER INFORMATION UPDATE | PHOTO BOOK ORDER |
| USE CONDITION 1003 | WITHOUT RESTRICTIONS | WITHOUT RESTRICTIONS | ORDINARY MEMBER | TWENTY YEARS OLD OR OLDER |

FIG.10B

| USER INFORMATION | |
|---|---|
| USER IDENTIFICATION INFORMATION | |
| APPLIANCE IDENTIFICATION INFORMATION | |
| NAME | |
| AGE | |
| ADDRESS | |
| MEMBER TYPE | ORDINARY MEMBER |
| | BROWSING MEMBER |

SERVER APPARATUS, AND CONTROL METHOD AND COMPUTER-READABLE STORAGE MEDIUM THEREFOR

BACKGROUND OF THE INVENTION

1. Field of the Invention

The present invention relates to a server apparatus capable of communicating with information processing apparatuses and electronic appliances through a network, and relates to a control method and a storage medium therefor.

2. Description of the Related Art

Various online services such as online photo album service and online shopping service have been provided by server apparatuses to electronic appliances through networks. When providing such a service, each server apparatus performs user authentication based on a user ID, password, appliance identification information, etc., thereby preventing unauthorized use of services by a third party (see, for example, Japanese Laid-open Patent Publication No. 2006-309355).

Some electronic appliances are configured to store information for user authentication. This poses a problem that, if such an electronic appliance is transferred to a third party, the third party is authenticated based on the original user's authentication information and becomes able to use services.

SUMMARY OF THE INVENTION

The present invention provides a server apparatus capable of preventing unauthorized use of services by a third party through an electronic appliance that stores information used for user authentication by the server apparatus, and provides a control method and a storage medium therefor.

According to one aspect of this invention, there is provided a server apparatus comprising a reception unit configured to receive, from an information processing apparatus through a network, pieces of user identification information that uniquely identify respective users, pieces of appliance identification information that uniquely identify respective electronic appliances, and pieces of use permission/prohibition information that represent on a per service type basis whether uses of services are permitted or prohibited, a storage unit configured to store the pieces of use permission/prohibition information so as to be associated with combinations of user identification information and appliance identification information, an acceptance unit configured to accept user identification information, appliance identification information, and service type information from any of the electronic appliances through the network, a determination unit configured to determine whether use of a service represented by the service type information accepted by the acceptance unit is permitted or prohibited based on use permission/prohibition information stored in the storage unit so as to be associated with a combination of the user identification information and the appliance identification information which are accepted by the acceptance unit, and a transmission unit configured, in a case where it is determined by the determination unit that use of the service represented by the service type information accepted by the acceptance unit is permitted, to transmit screen information for use of the service represented by the service type information to the electronic appliance.

Further features of the present invention will become apparent from the following description of exemplary embodiments with reference to the attached drawings.

BRIEF DESCRIPTION OF THE DRAWINGS

FIG. 3 is a block diagram showing an example hardware structure of an image pickup apparatus of the network system;

FIG. 4 is a view showing an example data structure of use permission/prohibition information managed by the server apparatus;

FIG. 9A is a view showing an example of a table in which pieces of use permission/prohibition information managed by the server apparatus are stored;

FIG. 9B is a view showing an example of a use permission/prohibition information table, which is referred to by the server apparatus in a third embodiment of this invention;

FIG. 9C is a view showing an example of a use permission/prohibition information table to which new use permission/prohibition information is added;

FIG. 10A is a view showing an example of a category-based service information table, which is referred to by the server apparatus;

FIG. 10B is a view showing an example of user information;

DESCRIPTION OF THE EMBODIMENTS

The present invention will now be described in detail below with reference to the drawings showing preferred embodiments thereof.

First Embodiment

In a network system according to a first embodiment of this invention, it is possible to prevent a third party from using services (provided by a server apparatus) through an electronic appliance, which is transferred from an original user, with information used for user authentication by the server apparatus kept stored.

Figure 1:
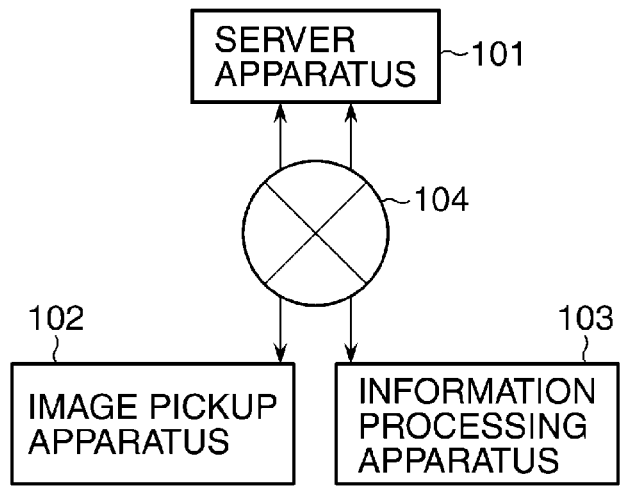
FIG. 1 is a schematic view showing an example construction of a network system according to a first embodiment of this invention.

FIG. 1 shows an example construction of the network system. The network system includes a server apparatus 101, image pickup apparatuses (one of which is denoted by reference numeral 102), and information processing apparatuses (one of which is denoted by reference numeral 103). The image pickup apparatus 102 and the information processing apparatus 103 are each connected to the server apparatus 101 through a network 104.

The server apparatus 101 provides network services (hereinafter, referred to as the services) to the image pickup apparatus 102, and has a user authentication function, new user registration function, use permission/prohibition switchover function, etc. The image pickup apparatus 102 is an example of an electronic appliance, and has a function for photographing an object, a function for transmitting a photographed image to the server apparatus 101, etc. The information processing apparatus 103 has a function for requesting the server apparatus 101 to make a switchover of each of services between usable and unusable, these services being provided by the service apparatus 101 to the image pickup apparatus 102.

The following is a description of the outline of the server apparatus 101 and the image pickup apparatus 102 for a case where the server apparatus 101 provides an online album service. In the online album service, a user uploads a photographed image to the server apparatus 101 through the image pickup apparatus 102 and the network 104, and a third party downloads the photographed image through an information processing apparatus and causes the downloaded image to be displayed on a display device. The user is required to be authenticated by the server apparatus 101 through the image pickup apparatus 102 before uploading the photographed image to the server apparatus 101.

The server apparatus 101 has a permission/prohibition switchover function for setting the use of the online album service to be permitted or prohibited on a per image pickup apparatus basis. The server apparatus 101 does not provide the online album service to an image pickup apparatus for which the use of the service is prohibited by the permission/prohibition switchover function, even if the user is successfully authenticated as being an authorized user. It should be noted that the user wishing to make the switchover between use permission and use prohibition is required to authenticated by the server apparatus 101 through the information processing apparatus 103.

The server apparatus 101 has a new user registration function for generating and registering, according to a request for use of online album service from a new user, new user identification information that uniquely identifies the user. The generated user identification information is notified to the new user by a known method. The new user authenticated by using the notified user identification information is able to use the online album service and make the switchover thereof between use permission and use prohibition.

When a user's operation for photographing is performed, the image pickup apparatus 102 generates a photographed image, automatically communicates with the server apparatus 101 through the network 104, and transmits the photographed image to the server apparatus 101 after the user authentication is made. The server apparatus 101 stores the received photographed image so as to be associated with an online album. For the user authentication, user identification information is input to the image pickup apparatus 102. If the user causes the image pickup apparatus 102 to store the user identification information, which is input when the user authentication is made for the first time, the user identification information is not required to be input for subsequent user authentication. It should be noted that the user identification information stored in the image pickup apparatus 102 can be erased according to a user's operation, however, there is a case where the user forgets erasing the user identification information before transfer of the image pickup apparatus 102 to a third party.

Figure 2:
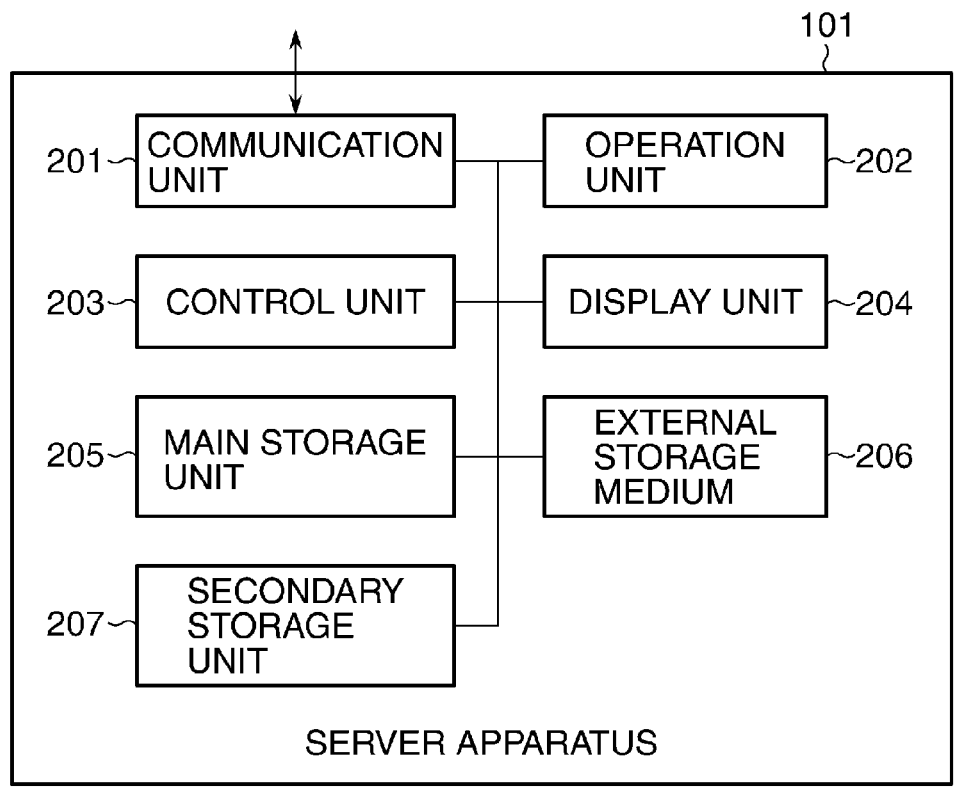
FIG. 2 is a block diagram showing an example hardware structure of a server apparatus of the network system.

FIG. 2 shows an example hardware structure of the server apparatus 101. The server apparatus 101 includes a communication unit 201, operation unit 202, control unit 203, display unit 204, main storage unit 205, external storage medium 206, and secondary storage unit 207.

The communication unit 201 controls communication with another apparatus such as the image pickup apparatus 102 or the information processing apparatus 103 through the network 104. The operation unit 202 includes a keyboard, mouse, or the like through which a user's instruction is given or input to the server apparatus 101. The control unit 203, which is a CPU or the like, executes various processes based on programs stored in, e.g., the secondary storage unit 207, and overall controls respective units of the server apparatus 101 connected to a system bus.

The display unit 204 is comprised of, e.g., a display on which a GUI (graphical user interface) or the like is displayed. The main memory 205 is, e.g., a RAM, and functions as, e.g., a work area for the control unit 203. The external storage medium 206 is, e.g., a CD-ROM in which various programs, various data, etc. are stored. The secondary storage unit 207 is an HD (hard disk) or the like, and stores various programs, various data, etc.

In this embodiment, the control unit 203 performs processes according to procedures written in programs stored in, e.g., the secondary storage unit 207, whereby the functions of the server apparatus 101 and processes shown in flowcharts described later are realized.

FIG. 3 shows an example hardware structure of the image pickup apparatus 102. The image pickup apparatus 102 includes a communication unit 301, secondary storage unit 302, control unit 303, operation unit 304, signal processing unit 305, display unit 306, optical unit 307, read only memory 308, primary storage unit 309, and external storage medium 310.

The communication unit 301 controls communication with another apparatus such as the server apparatus 101 through the network 104. The secondary storage unit 302 is a built-in flash ROM or the like, and stores various programs, various parameters, etc. The control unit 303 is a CPU or the like, performs various processes based on programs stored in, e.g., the secondary storage unit 302, and overall controls respective units connected to a system bus.

The operation unit 304 includes operation buttons, etc. through which a user's instruction is given (input) to the image pickup apparatus 102. The signal processing unit 305 performs processes for compression/encoding, edge enhancement, noise removal, etc. on a photographed image. The display unit 306 is comprised of, e.g., a display on which a photographed image or the like is displayed. The optical unit 307 includes lenses, CCD, drive circuits, etc. The read only memory 308 is, e.g., a ROM in which various programs, various parameters, etc. are stored. The primary storage unit 309 is, e.g., a DRAM, and functions as, e.g., a work area for the control unit 303. The external storage medium 310 is, e.g., a card memory in which various data, etc. are stored.

In this embodiment, the control unit 303 performs processes according to procedures written in programs stored in, e.g., the secondary storage unit 302, whereby the functions of the image pickup apparatus 102 and processes shown in flowcharts described later are realized.

The following is a description of a hardware structure of the information processing apparatus 103. The information processing apparatus 103 has the same hardware structure as the server apparatus 101, which is shown in FIG. 2. By operating the operation unit of the information processing apparatus 103, the user is able to set user identification information used for user authentication to the information processing apparatus 103 and change the setting of use permission/prohibition information about services provided by the server apparatus 101, for example.

It should be noted that functions of the information processing apparatus 103 and processes described later with reference to flowcharts are realized by the control unit of the information processing apparatus 103 by executing programs stored in the secondary storage unit or the like.

The following is a description of use permission/prohibition information managed by the server apparatus 101. An example of data structure of the use permission/prohibition information is shown in FIG. 4. Pieces of use permission/prohibition information are stored in the secondary storage unit 207 of the server apparatus 101 so as to be associated with combinations of user identification information and appliance identification information. Pieces of appliance identification information are information, such as appliance fabrication numbers, that uniquely identify respective image pickup apparatuses. Pieces of use permission/prohibition information represent whether uses of services are permitted or prohibited.

The server apparatus 101 performs a setting of use permission/prohibition information and changes the setting thereof on a per user's image pickup apparatus basis according to a user's operation through the operation unit of, e.g., the information processing apparatus 103.

Figure 5:
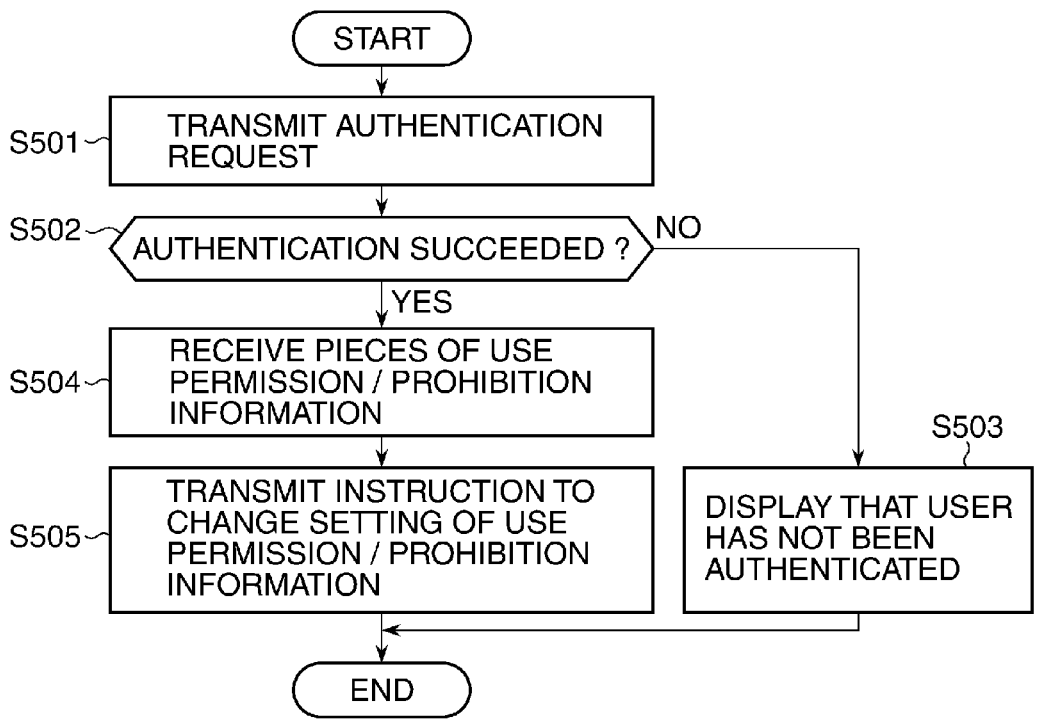
FIG. 5 is a flowchart showing an example of a process performed by an information processing apparatus of the network system for giving an instruction to change the settings of use permission/prohibition information.

FIG. 5 shows in flowchart an example of a process performed by the information processing apparatus 103 for giving an instruction to change the settings of use permission/prohibition information.

In step S501, the control unit 203 of the information processing apparatus 103 transmits, to the server apparatus 101 through the communication unit 201, a user authentication request and information used for authentication that includes user identification information input by the user through the operation unit 202 into the information processing apparatus 103.

In step S502, the control unit 203 receives a result of the authentication by the server apparatus 101 therefrom through the communication unit 201, and determines whether the authentication has succeeded. When determining that the authentication has succeeded, the control unit 203 proceeds to step S504. Otherwise, it proceeds to step S503.

In step S503, the control unit 203 causes the display unit 204 to display that the user has not been authenticated. Then, the present process is completed. In other words, the server apparatus 101 does not change the settings of pieces of use permission/prohibition information.

In step S504, the control unit 203 receives from the server apparatus 101 through the communication unit 201 pieces of use permission/prohibition information on image pickup apparatuses, which correspond to pieces of appliance identification information associated with the user identification information, and causes the display unit of the information processing apparatus 103 to display the received pieces of use permission/prohibition information on the image pickup apparatuses. Then, the process proceeds to step S505.

In step S505, the control unit 203 transmits to the server apparatus 101 an instruction to change the setting of the use permission/prohibition information on any of the image pickup apparatuses. In a case, for example, that a user operation is performed through the operation unit 202 of the information processing apparatus 103 to change the use permission/prohibition information on the image pickup apparatus 102 from use permission to use prohibition, the control unit 203 transmits to the server apparatus 101 through the communication unit 201 the user identification information, appliance identification information on a particular image pickup apparatus (e.g., the image pickup apparatus 102), use permission/prohibition information after change, etc., as an instruction to change the setting of the use permission/prohibition information on the particular image pickup apparatus.

Figure 6:
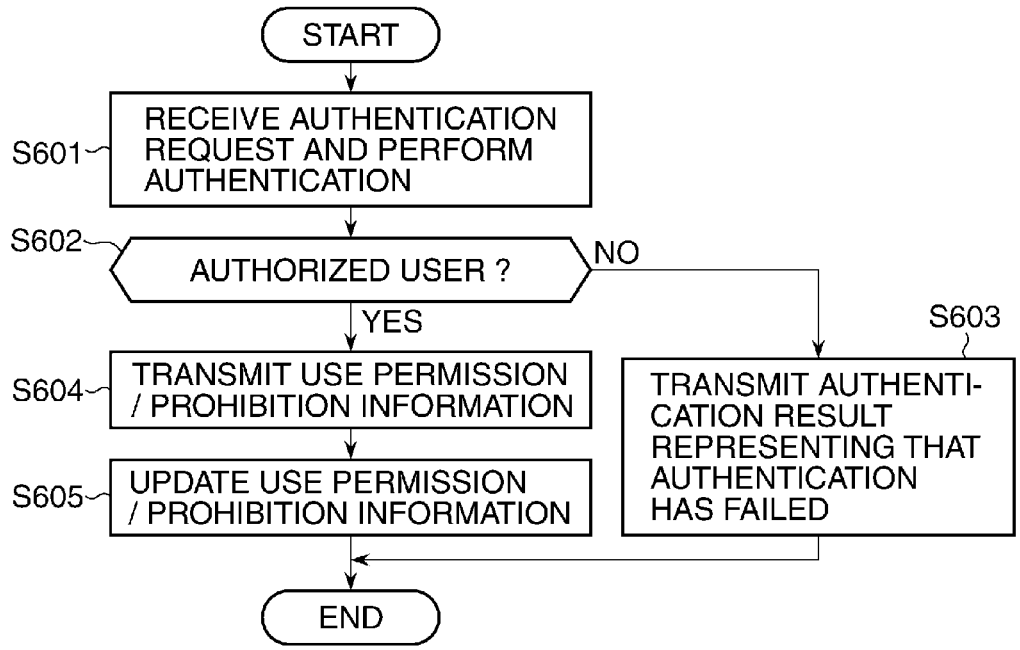
FIG. 6 is a flowchart showing an example of a process performed by the server apparatus for changing the settings of use permission/prohibition information.

FIG. 6 shows in flowchart an example of a process performed by the server apparatus 101 for changing the settings of use permission/prohibition information according to an instruction given from the information processing apparatus 103.

In step S601, the control unit 203 receives through the communication unit 201 a user authentication request transmitted from the information processing apparatus 103, and performs user authentication based on user identification information contained in the received request.

In step S602, the control unit 203 determines a result of the authentication. When determining that the user authentication has succeeded, the control unit 203 proceeds to step S604. Otherwise, it proceeds to step S603.

In step S603, the control unit 203 transmits, to the information processing apparatus 103 through the communication unit 201, the authentication result representing that the user has not been authenticated, and completes the present process. In other words, the server apparatus 101 does not change the settings of pieces of use permission/prohibition information.

In step S604, the control unit 203 reads from the secondary storage unit 207 piece of appliance identification information on all the image pickup apparatuses associated with the user identification information, pieces of relevant use permission/prohibition information, etc., and transmits the pieces of read information to the information processing apparatus 103 through the communication unit 201. Then, the process proceeds to step S605.

In step S605, the control unit 203 updates use permission/prohibition information stored in the secondary storage unit 207 according to an instruction given from the information processing apparatus 103. More specifically, the control unit 203 receives through the communication unit 201 the user identification information, appliance identification information, use permission/prohibition information after change, etc. transmitted from the information processing apparatus 103, and stores them as new use permission/prohibition information into the secondary storage unit 207.

By the above-described process, the settings of use permission/prohibition information managed by the server apparatus 101 about the image pickup apparatuses used by the user are changed.

Figure 7:
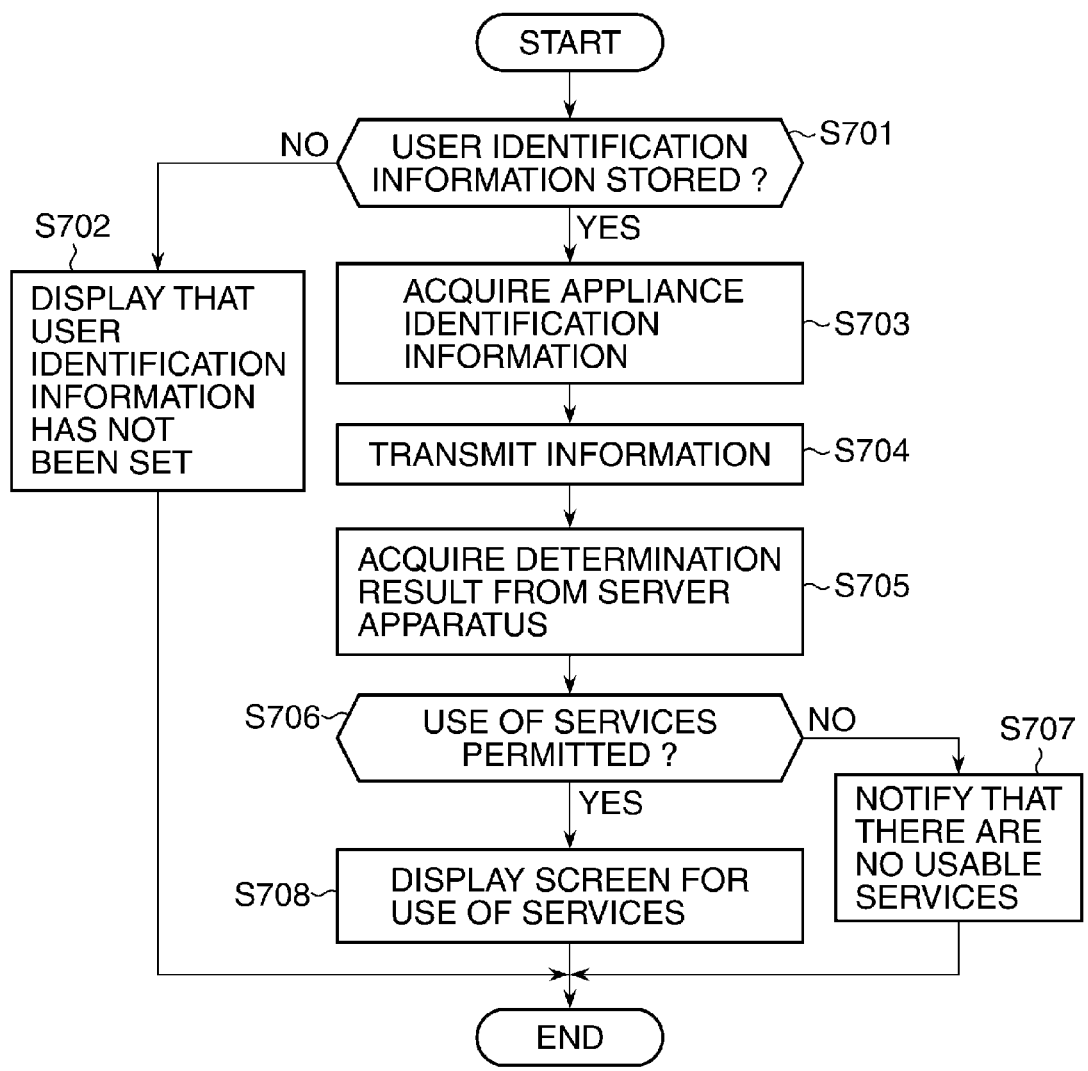
FIG. 7 is a flowchart showing an example of a service use process performed by the image pickup apparatus.

FIG. 7 shows in flowchart an example of a service use process performed by the image pickup apparatus 102.

In step S701, the control unit 303 of the image pickup apparatus 102 determines whether one or more pieces of user identification information are stored in the secondary storage unit 302. When determining that one or more pieces of user identification information are stored in the secondary storage unit 302, the control unit 303 reads the user identification information, and proceeds to step S703. Otherwise, the control unit 303 proceeds to step S702.

In step S702, the control unit 303 causes the display unit 306 to display that user identification information has not been set. Then, the present process is completed.

In step S703, the control unit 303 reads one or more pieces of appliance identification information from the secondary storage unit 302, and proceeds to step S704. In step S704, the control unit 303 transmits to the server apparatus 101 through the communication unit 301 the user identification information, appliance identification information, and service type information representing a desired service type, as information used for user authentication. Information about the server apparatus 101 (such as address information corresponding to the desired service) is stored in the read only memory 308. The control unit 303 reads the information about the server apparatus 101, and uses it for communication connection therewith. Then, the process proceeds to step S705.

In step S705, the control unit 303 receives through the communication unit 301 a determination result transmitted from the server apparatus 101, and proceeds to step S706. In step S706, the control unit 303 determines whether use of services is permitted based on the received determination result. More specifically, the control unit 303 determines whether screen information on a web page for use of services has been received from the server apparatus 101. When determining that use of services is permitted, the control unit 303 proceeds to step S708. Otherwise, it proceeds to step S707.

In step S707, the control unit 303 causes the display unit 306 to display a dialog screen to indicate that services cannot be used (i.e., there are no usable services). Then, the present process is completed.

In step S708, the control unit 303 causes the display unit 306 to display a screen for use of services based on screen information received from the server apparatus 101, and completes the present process. In the case of an online album service, images uploaded to the server apparatus 101 are displayed on the screen in a list.

Figure 8:
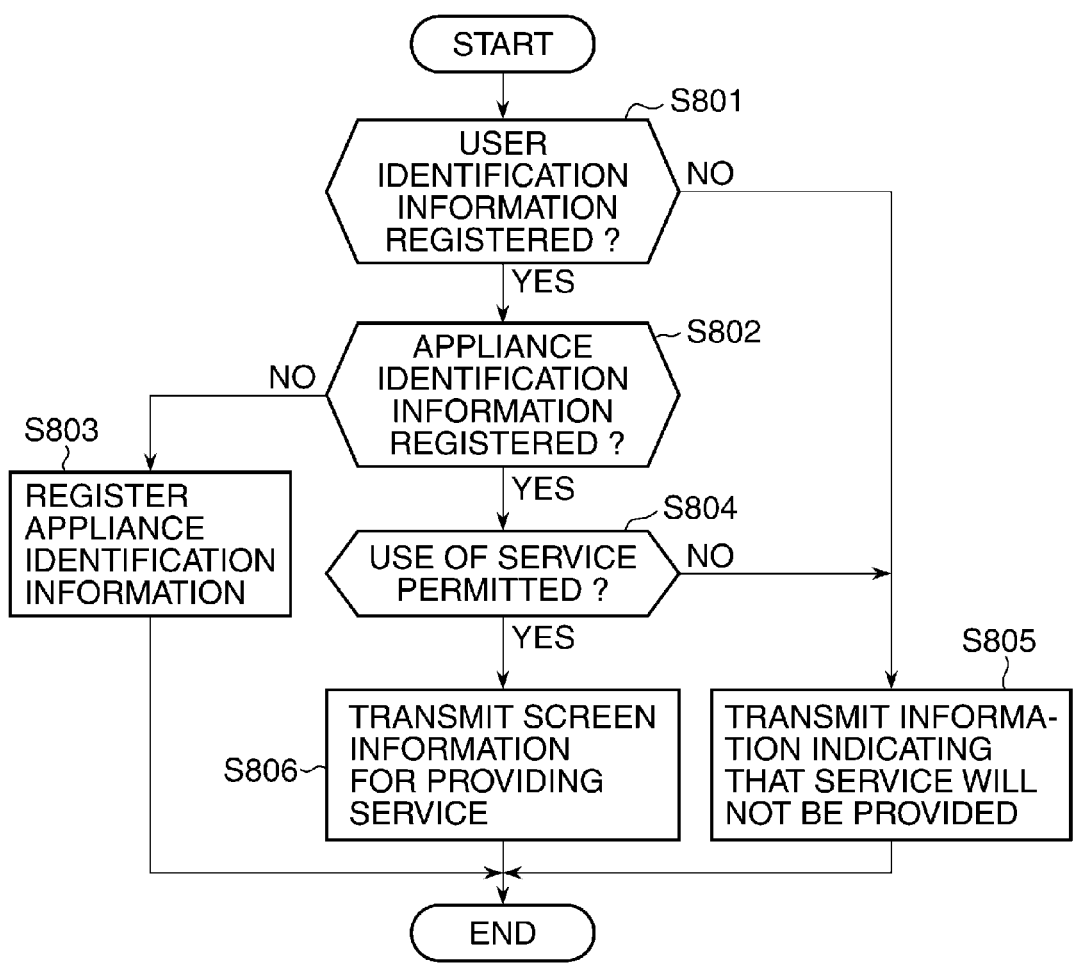
FIG. 8 is a flowchart showing an example of a service provision process performed by the server apparatus.

FIG. 8 shows in flowchart an example of a service provision process performed by the server apparatus 101.

In step S801, the control unit 203 of the server apparatus 101 performs authentication based on information used for authentication that is transmitted from the image pickup apparatus 102 and accepted through the communication unit 201, and determines whether the authentication has succeeded. More specifically, the control unit 203 determines whether user identification information contained in an authentication request is stored in the secondary storage unit 207. The control unit 203 proceeds to step S802 when determining that the user authentication has succeeded, and proceeds to step S805 when determining that the user authentication has failed.

In step S802, the control unit 203 determines whether the appliance identification information contained in the authentication request is stored in the secondary storage unit 207 so as to be associated with the user identification information. When determining that the appliance identification information is stored in the storage unit 207, the control unit 203 proceeds to step S804. Otherwise, it proceeds to step S803.

In step S803, the control unit 303 additionally stores the appliance identification information into the secondary storage unit 207 so as to be newly associated with the user identification information contained in the authentication request. Then, the process proceeds to step S806.

In step S804, the control unit 203 determines whether use of a service of the type desired by the user is permitted, while referring to pieces of use permission/prohibition information stored in the secondary storage unit 207 so as to be associated with combinations of user identification information and appliance identification information. The control unit 203 proceeds to step S806 when determining that the use of service is permitted, and proceeds to step S805 when determining that the use of service is prohibited.

In step S805, the control unit 203 transmits to the image pickup apparatus 102 information indicating that the service will not be provided, and completes the present process.

In step S806, the control unit 203 transmits to the image pickup apparatus 102 screen information for providing the service, and completes the present process.

According to this embodiment, even after transferring the image pickup apparatus 102 to a third party, the original user is capable of operating the information processing apparatus 103 to change the settings of use permission/prohibition of services provided by the server apparatus 101 to the image pickup apparatus 102. It is therefore possible to prevent the third party from being authenticated by the server apparatus based on the original user's identification information, whereby unauthorized use of services can be prevented.

The image pickup apparatus 102 of the embodiment transmits the authentication request to the server apparatus 101 at the time of photographing. However, the transmission of the authentication request can be started in response to a user's operation, without being in synchronism with photographing.

For example, it is possible to start the transmission of the authentication request at a timing where the user operates the operation unit 304 of the image pickup apparatus 102 so as to display a photographed image on the display unit 306 or turn on the electric power.

When setting use permission/prohibition information, which is associated with given user identification information and particular appliance identification information, in such a manner that use of a relevant service is made permitted, the control unit 203 of the server apparatus 101 is able to set all the pieces of use permission/prohibition information, which are associated with other pieces of user identification information and the particular appliance identification information, in such a manner that uses of all the relevant services are made prohibited.

The programs for use by the control unit 203 of the server apparatus 101 can be provided from the secondary storage unit 207 or the external storage medium 206, or from, e.g., an information processing apparatus through the communication unit 201. Similarly, the programs for use by the control unit 303 of the image pickup apparatus 102 can be provided from the read only memory 308 or the external storage medium 310, or from, e.g., an information processing apparatus through the communication unit 301.

Second Embodiment

With a network system according to a second embodiment of this invention, when transferring to a third party an electronic appliance that stores information used for user authentication, a user is able to prohibit use of only one or more services which are selected from among various services.

The network system of this embodiment has the same construction as the first embodiment and includes the server apparatus 101, image pickup apparatus 102, and information processing apparatus 103. These apparatuses have the below-described functions as well as the same functions as those achieved by the first embodiment.

The server apparatus 101 not only provides the online album service, but also provides a print order service. To provide the print order service, the server apparatus 101 receives from the image pickup apparatus 102 a print order of images associated with an online album, prints the images, and makes arrangement to mail a printed product to the address notified by the user. In this embodiment, the user is able to individually and changeably make use permission/prohibition settings of the online album service and print order service, which are provided by the server apparatus 101.

The image pickup apparatus 102 has a function of sending an order of print order service to the server apparatus 101. The information processing apparatus 103 has a function of making, on a per service basis, use permission/prohibition settings of services, which are provided from the server apparatus 101 to the image pickup apparatus 102.

The server apparatus 101, image pickup apparatus 102, and information processing apparatus 103 of this embodiment have the same hardware structures as those of the first embodiment. By operating the operation unit 304 of the image pickup apparatus 102, the user can be authenticated by the server apparatus 101 and can enjoy the online album service and print order service.

The following is a description of use permission/prohibition information managed by the server apparatus 101. In FIG. 9A, an example of use permission/prohibition information table is shown, which is stored in the secondary storage unit 207 of the server apparatus 101. Pieces of use permission/prohibition information (either permitted or prohibited) are stored in the table on a per service type basis so as to correspond to combinations of user identification information and appliance identification information.

In accordance with a user's operation through the operation unit of the information processing apparatus 103, the server apparatus 101 changes the settings of use permission/prohibition information on a per image pickup apparatus basis and on a per service type basis, where image pickup apparatuses and service types are associated with user identification information.

In this embodiment, as with the first embodiment, a process for giving an instruction to change the settings of use permission/prohibition information and a process for changing the settings of use permission/prohibition information are performed. When the user uses an online album service or a print order service, the server apparatus 101 and the image pickup apparatus 102 perform processes similar to those performed in the first embodiment. In a case that use permission/prohibition information on the service desired by the user is set such that the use of the service is permitted, screen information corresponding to the service is provided from the server apparatus 101. Alternatively, pieces of screen information corresponding to use permission/prohibition settings of plural services can be provided from the server apparatus 101. In a case, for example, that both the use of online album service and the use of print order service are permitted, a button for giving an instruction for print order, as well as a list of images of albums, are displayed on the screen. On the other hand, in a case where the use of online album service is permitted but the use of print order service is prohibited, only the list of images of albums is displayed on the screen, without the button for instructing the instruction for print order being displayed.

According to this embodiment, when the electronic appliance stored with user identification information for use of services is lent from the user to a third party, the user is able to change the use permission/prohibition settings of the services on a per service type basis, such as prohibiting one or more of the services.

Third Embodiment

The server apparatus 101 of a network system according to a third embodiment of this invention sets use permission/prohibition information about a service newly provided to a user based on use permission/prohibition information about other existing services used by the user, user information, use history information in the past, etc.

For convenience of description, it is assumed in this embodiment that there are three existing services (i.e., online album service, print order service, and online shop service) and that a new service (i.e., a photo book order service) is added.

The network system of this embodiment has the same construction as the first embodiment, and includes the server apparatus 101, image pickup apparatus 102, and information processing apparatus 103 each having the same hardware structure as the corresponding apparatus of the first embodiment. By operating the operation unit 304 of the image pickup apparatus 102, the user can be authenticated by the server apparatus 101 and can use services.

The following is a description of use permission/prohibition information managed by the server apparatus 101. In FIG. 9B, an example of use permission/prohibition information table is shown. In the table which is stored in the secondary storage unit 207 of the server apparatus 101, pieces of use permission/prohibition information (either permitted or prohibited) are stored on a per service type basis so as to correspond to combinations of user identification information and appliance identification information.

FIG. 9C shows an example of a use permission/prohibition information table to which a photo book order service has been newly added. In the table, which is stored in the secondary storage unit 207 of the server apparatus 101, use permission/prohibition information on photo book order service is stored so as to correspond to combinations of user identification information and appliance identification information.

FIG. 10A shows an example of a category-based service information table. In this table, which is stored in the secondary storage unit 207 of the server apparatus 101, pieces of service information indicating services which are classified into categories are updatably stored.

The table shown in FIG. 10A includes a category field 1001 in which a plurality of categories (e.g., categories A to D) are provided. A news service, an advertising service, and a promotion service are classified as category A, a content browsing service is classified as category B, a personal information service and a content update service are classified as category C, and a purchase service and a billing service are classified as category D.

In a service field 1002, service types each belonging to a corresponding one of the categories A to D are shown. For example, a print order service is classified as category D. In a use condition field 1003, there are shown conditions each of which must be satisfied when a corresponding one of the services belonging to categories A to D is used. For example, it is indicated that services belonging to category D can be used by users who are twenty years old or older.

FIG. 10B shows an example of user information. User information is personal information of a user, which is referred to in order to determine whether the use condition is satisfied and which is managed by the server apparatus 101. The user information includes user identification information, appliance identification information, information about name, age, address of the user, member type information, etc.

The following is a description of an operation of the server apparatus 101 for automatically setting use permission/prohibition information about an additional service when the service is newly added to services provided by the server apparatus 101.

Figure 11:
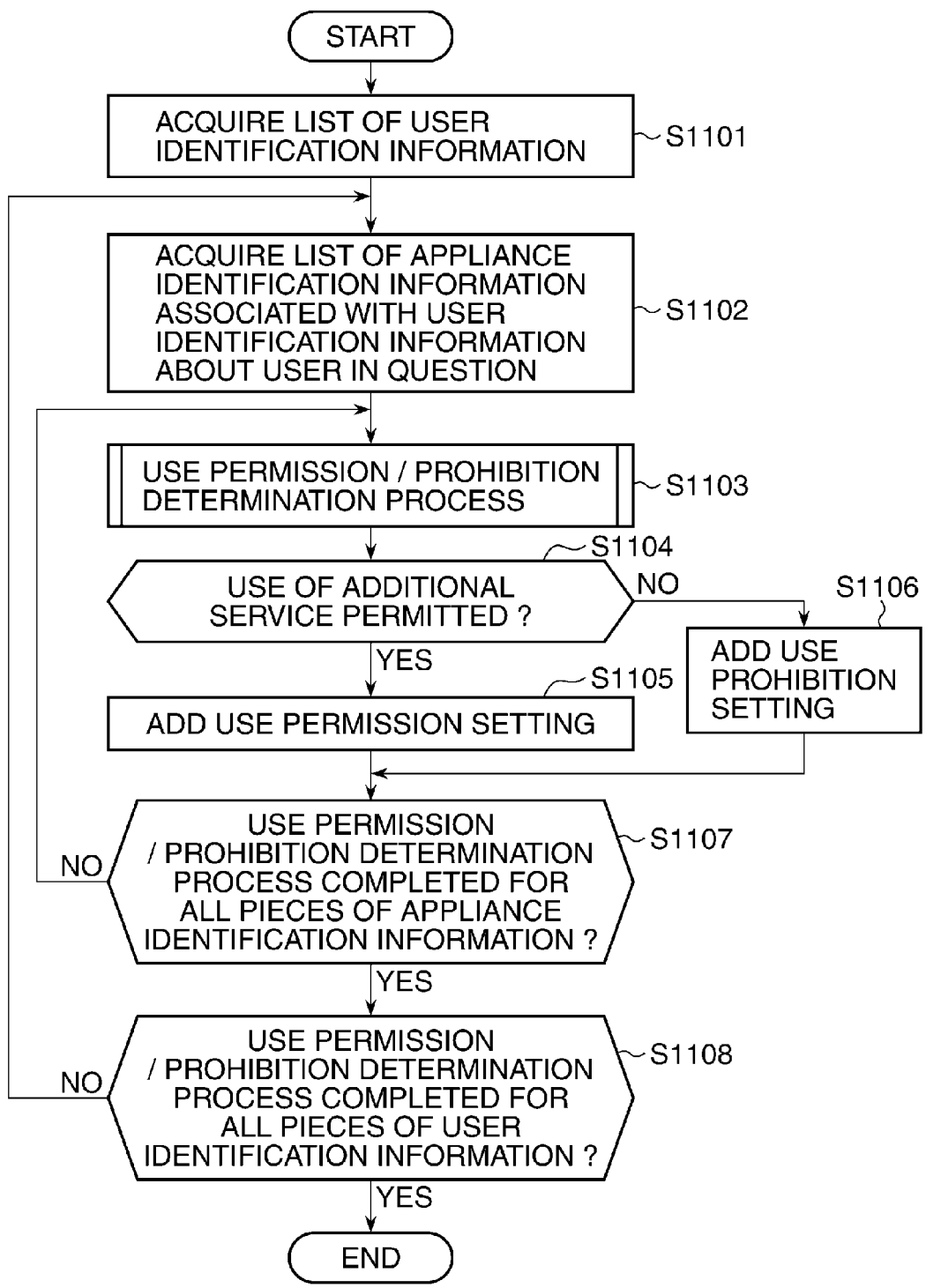
FIG. 11 is a flowchart showing an example of a process to add use permission/prohibition information about an additional service.

FIG. 11 shows in flowchart an example of a process performed by the control unit 203 of the server apparatus 101 to add use permission/prohibition information about an additional service.

In step S1101, the control unit 203 acquires from the secondary storage unit 207 pieces of user identification information about all the users, and proceeds to step S1102. In step S1102, the control unit 203 acquires from the secondary storage unit 207 a list of all the pieces of appliance identification information, which are associated with user identification information about a user who is the object of the present process (hereinafter, referred to the user in question). Then, the process proceeds to step S1103.

In step S1103, the control unit 203 executes a use permission/prohibition determination process about one of the pieces of appliance identification information contained in the list. In the determination process, the control unit 203 determines a setting of use permission/prohibition information about an additional service, as will be described later. In step S1104, the control unit 203 determines whether use of the additional service is permitted on the basis of a result of the determination in step S1103. The control unit 203 proceeds to step S1105 when determining that use of the additional service is permitted, and proceeds to step S1106 when determining that use of the additional service is prohibited.

In step S1105, the control unit 203 adds a use permission setting about the additional service to the use permission/prohibition information, which is associated with the appliance identification information subjected to the determination process, stores the resultant information, and proceeds to step S1107. In step S1106, the control unit 203 adds a use prohibition setting about the additional service to the use permission/prohibition information, stores the resultant information, and proceeds to step S1107.

In step S1107, the control unit 203 determines whether the use permission/prohibition determination process has been completed for all the pieces of appliance identification information about the user in question. When determining that the determination process has not been completed for all the pieces of appliance identification information, the control unit 203 returns to step S1103 where it performs the determination process for the next appliance identification information. On the other hand, if it is determined that the determination process has been completed for all the pieces of appliance identification information, the process proceeds to step S1108.

In step S1108, the control unit 203 determines whether the use permission/prohibition determination process has been completed for all the pieces of user identification information. When determining that the determination process has not been completed for all the pieces of user identification information, the control unit 203 returns to step S1102 where it acquires a list of appliance identification information associated with the next user identification information. On the other hand, if it is determined that the determination process has been completed for all the pieces of user identification information, the present process is completed.

FIGS. 12A to 12D each show in flowchart the use permission/prohibition determination process performed in step S1103 in FIG. 11 by the control unit 203 of the server apparatus 101.

Figure 12A:
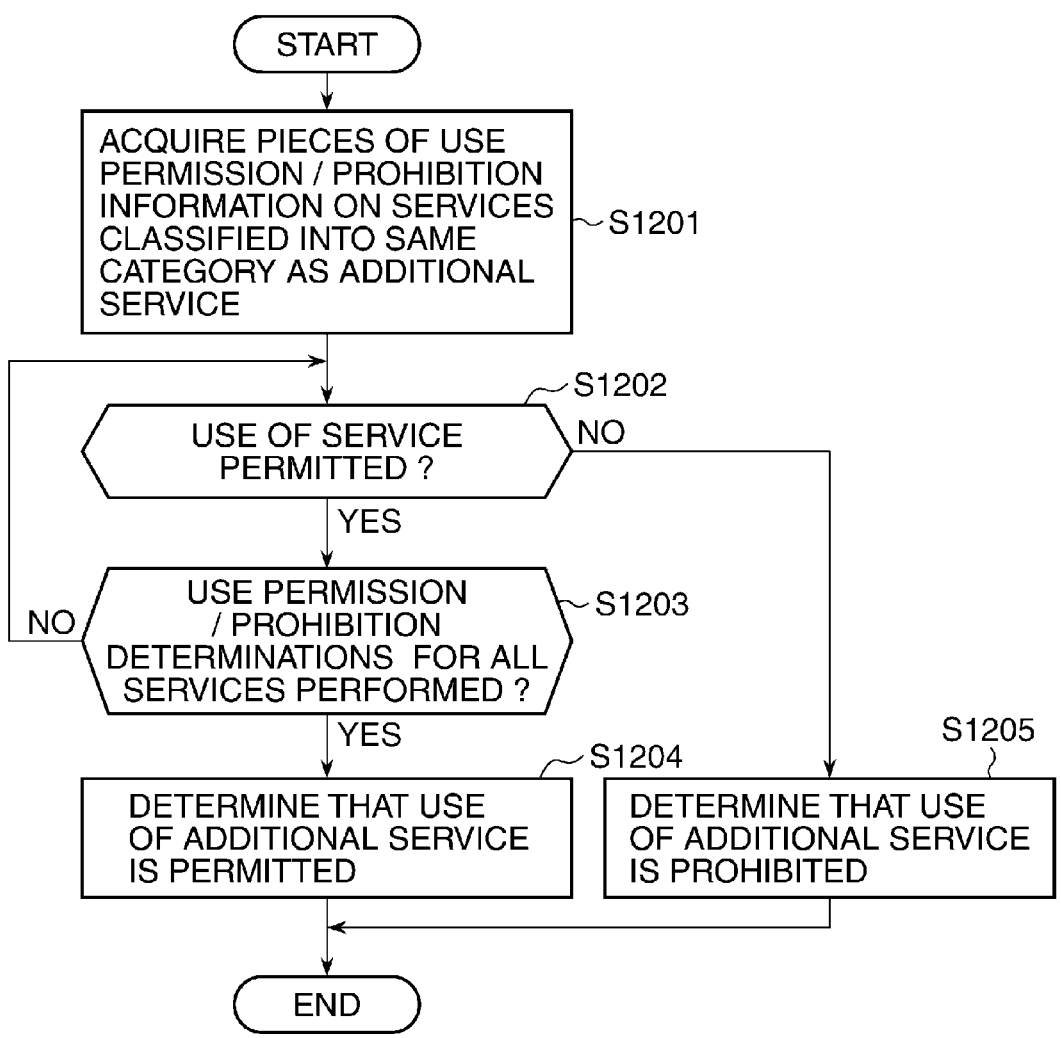
FIGS. 12A to 12D are flowcharts each showing a permission/prohibition determination process performed in step S1103 in the process shown in FIG. 11.

FIG. 12A shows in flowchart an example of the use permission/prohibition determination process, which is performed based on pieces of use permission/prohibition information corresponding to combinations of user identification information and appliance identification information about services which are classified into the same category as the additional service. In a case, for example, that the additional service is a photo book order service, the control unit 203 determines in the present process whether use of the additional service is permitted or prohibited based on pieces of use permission/prohibition information about the print order service and online shop service which are classified into the same category as the additional service. The control unit 203 determines that use of the additional service is prohibited, if there is use permission/prohibition information in which at least one of the services classified into the same category as the additional service is set to be prohibited from being used.

In step S1201, the control unit 203 acquires (i.e., reads from the category-based service information table stored in the secondary storage unit 207) pieces of use permission/prohibition information corresponding to combinations of user identification information and appliance identification information about the services classified into the same category as the additional service.

In step S1202, the control unit 203 selects one of the acquired pieces of use permission/prohibition information as use permission/prohibition information about a service which is the object of this process (i.e., the service in question), and determines based on the selected information whether the service in question is set to be permitted or prohibited from being used. When determining that the service in question is set to be permitted from being used, the control unit 203 proceeds to step S1203. Otherwise, it proceeds to step S1205.

In step S1203, the control unit 203 determines whether the use permission/prohibition determination has been performed for all the services classified into the same category as the additional service. When determining that the determination has not been performed for all these services, the control unit 203 returns to step S1202 where it determines whether a service corresponding to the next use permission/prohibition information acquired in step S1201 is set to be permitted or prohibited from being used. On the other hand, if it is determined that the determination has been performed for all the services, the process proceeds to step S1204.

In step S1204, the control unit 203 determines that use of the additional service is permitted, and completes the present process. In step S1205, the control unit 203 determines that use of the additional service is prohibited, and completes the process.

Figure 12B:
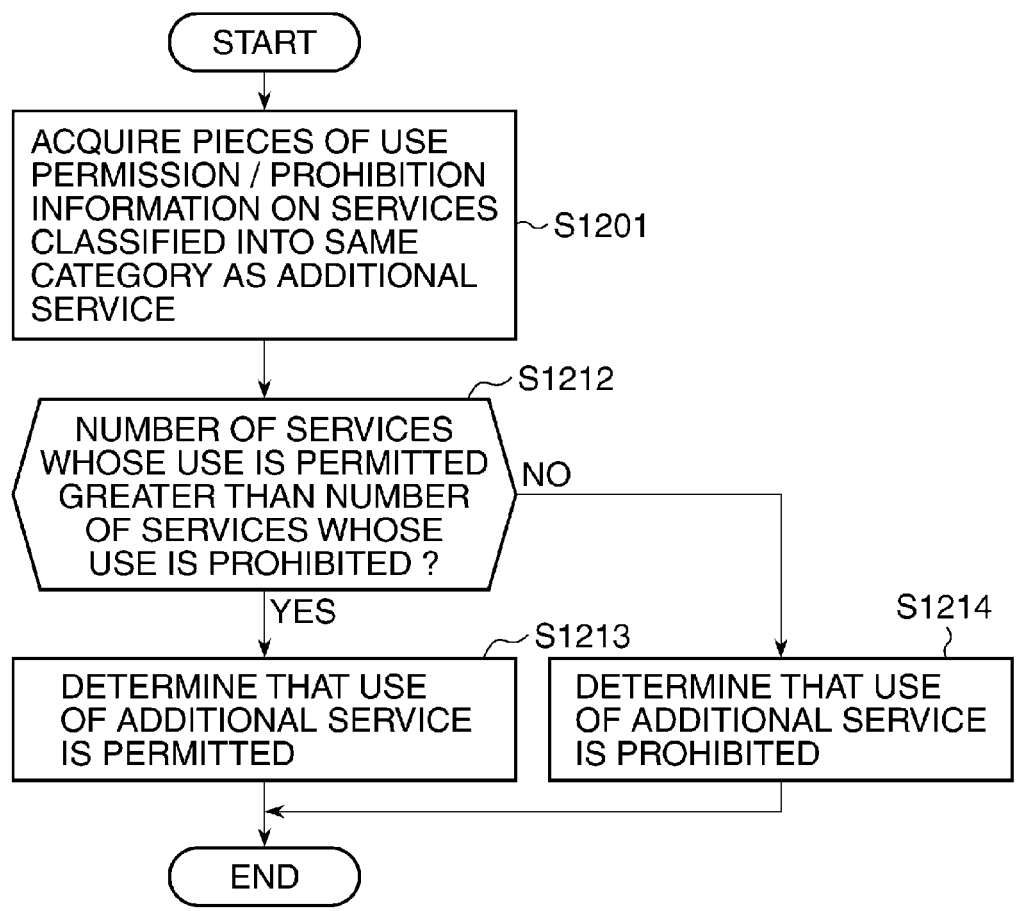

FIG. 12B shows in flowchart another example of the permission/prohibition determination process performed based on pieces of use permission/prohibition information corresponding to combinations of user identification information and appliance identification information about services classified into the same category as the additional service. In this process, the control unit 203 determines whether use of the additional service is permitted or prohibited based on the number of services whose use is permitted and the number of services whose use is prohibited among the services classified into the same category as the additional service.

In step S1201, the control unit 203 acquires pieces of use permission/prohibition information corresponding to combinations of user identification information and appliance identification information of services classified into the same category as the additional service, as with step S1202 in FIG. 12A.

In step S1212, the control unit 203 refers to the pieces of use permission/prohibition information of services acquired in step S1201, and compares the number of services whose use is permitted with the number of services whose use is prohibited. The control unit 203 proceeds to step S1213 when determining that the number of services whose use is permitted is greater than the number of services whose use is prohibited, and proceeds to step S1214 when determining that the number of services whose use is permitted is equal to or less than the number of services whose use is prohibited.

In step S1213, the control unit 203 determines that use of the additional service is permitted, and completes the present process. In step S1214, the control unit 203 determines that user of the additional service is prohibited, and completes the process.

Figure 12C:
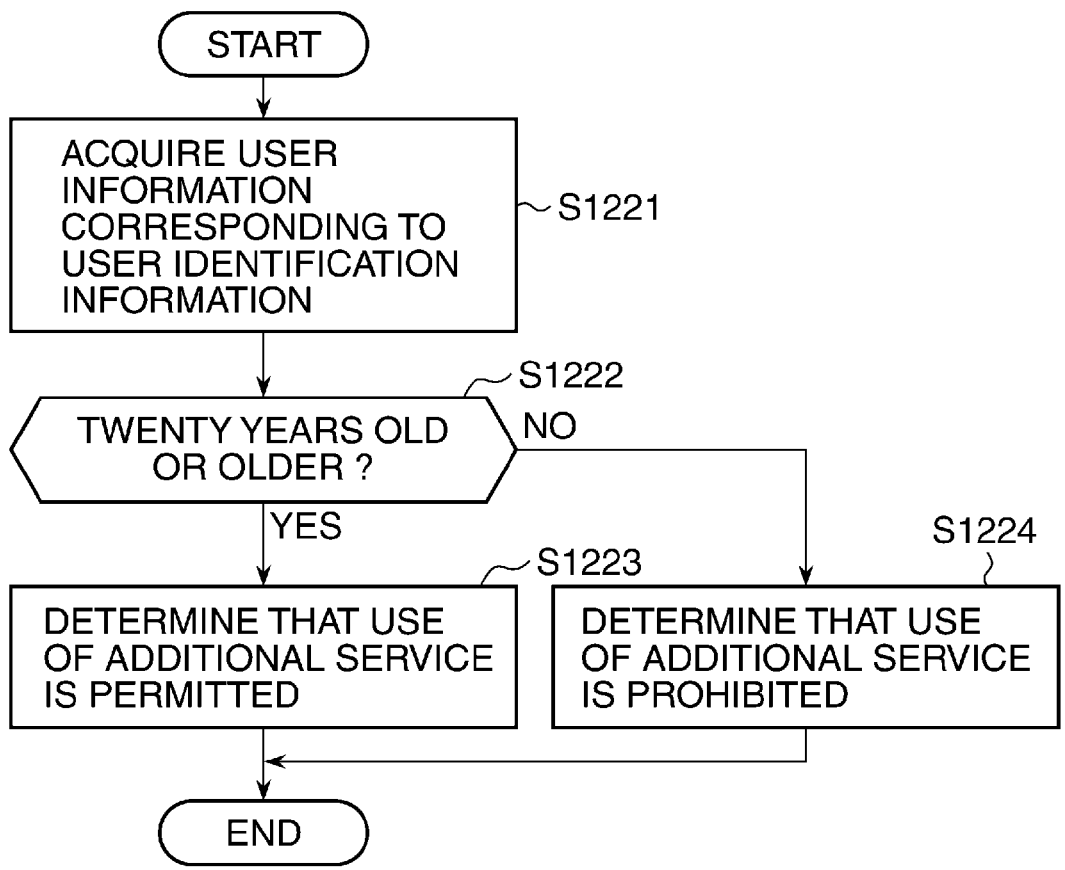

FIG. 12C shows in flowchart an example of the permission/prohibition determination process performed based on a use condition of services classified into the category in which the additional service is included. In the following, a description will be given of an example case where the additional service is a photo book order service and the use condition of services, which are classified into the category in which the photo book order service is included, is that users must be twenty years old or older.

In step S1221, the control unit 203 acquires user information corresponding to the user identification information about the user in question from the secondary storage unit 207.

In step S1222, the control unit 203 determines the user's age based on the user information. The control unit 203 proceeds to step S1223 when determining that the user is twenty years old or older, and proceeds to step S1224 when determining that the user is younger than twenty years old.

In step S1223, the control unit 203 determines that use of the additional service is permitted, and completes the present process. In step S1224, the control unit 203 determines that use of the additional service is prohibited, and completes the process.

In this example, the control unit 203 determines in step S1222 whether or not the user is twenty years old or older, but this is not limitative. In a case, for example, that a service belonging to category C is newly added, the user must satisfy the use condition that the user be an ordinary member as indicated in the category-based service information table shown in FIG. 10A. Therefore, the control unit 203 determines whether the member type indicated in the user information is ordinary member or browsing member, thereby determining whether use of the additional service is permitted or prohibited.

Figure 12D:
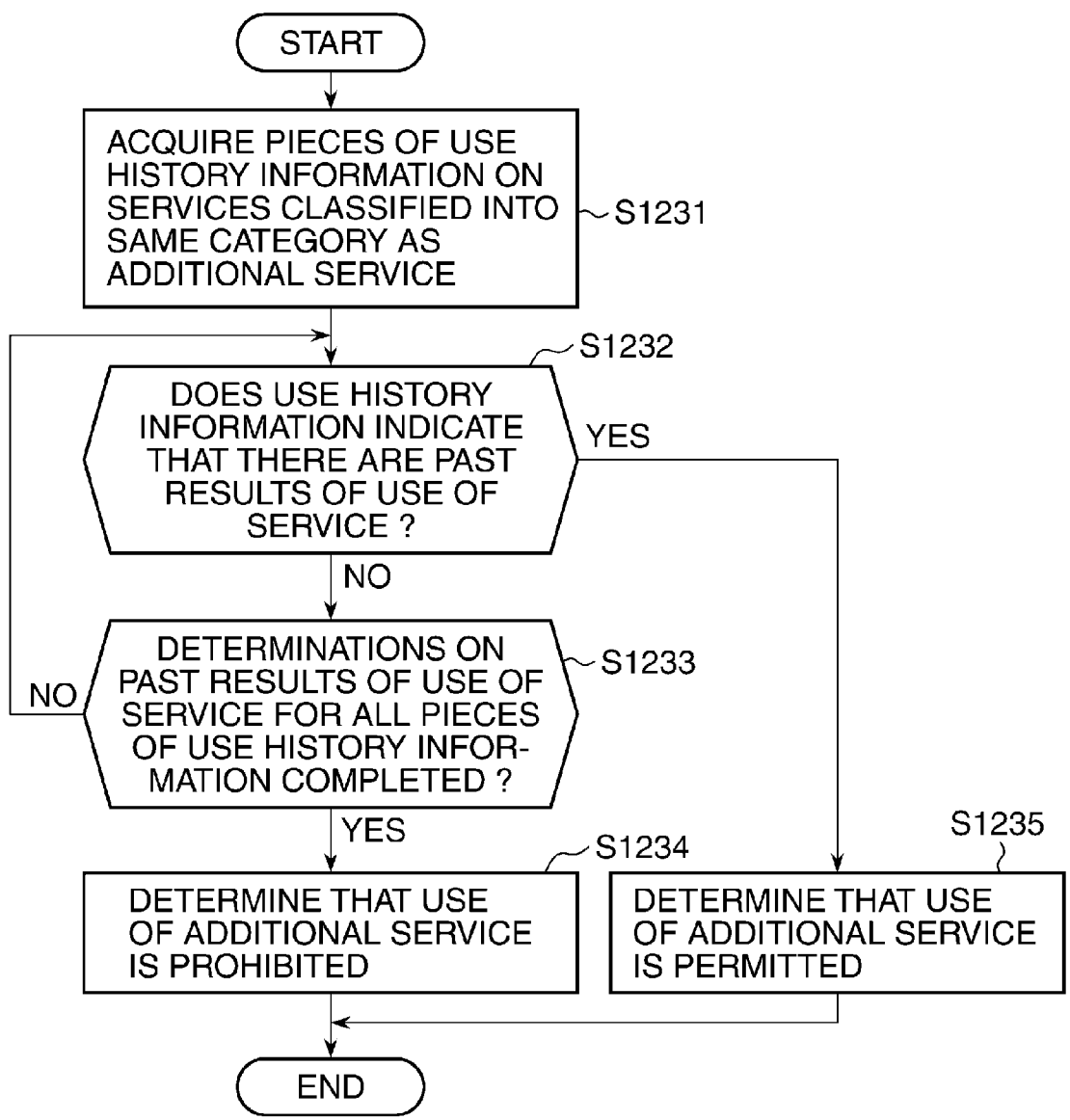

FIG. 12D shows in flowchart an example of the permission/prohibition determination process performed based on pieces of use history information of services classified into the same category as the additional service. In a case, for example, that the additional service is a photo book order service, the control unit 203 determines in the present process whether use of the additional service is permitted or prohibited based on respective pieces of use history information on the print order service and online shop service which are classified into the same category as the photo book order service. When determining that use history information indicating past results of use is present in at least one of the services classified into the same category as the additional service, the control unit 203 determines that use of the additional service is permitted.

In step S1231, the control unit 203 acquires from the category-based service information table stored in the secondary storage unit 207 pieces of use history information about services which are classified into the same category as the additional service.

In step S1232, the control unit 203 determines whether a given one of the pieces of use history information acquired in step S1231 indicates that there are past results of use of service. When determining that the use history information indicates that there are no past results of use of service, the control unit 203 proceeds to step S1233. Otherwise, the process proceeds to step S1235.

In step S1233, the control unit 203 determines whether the determination on past results of use of service has been completed for all the pieces of use history information. When determining that the determination on past results of use of service has not been completed for all the pieces of use history information, the control unit 203 returns to step S1232 where it determines whether the next use history information indicates past results of use of service. On the other hand, when determining that the determination on past results of use of service has been completed for all the pieces of use history information, the control unit 203 proceeds to step S1234.

In step S1234, the control unit 203 determines that use of the additional service is prohibited, and completes the present process. In step S1235, the control unit 203 determines that use of the additional service is permitted, and completes the process.

With this embodiment, use permission/prohibition information about a newly added service can be set based on pieces of use permission/prohibition information about existing services, user information, and/or pieces of use history information.

In the above-described embodiment, the control unit is configured to additionally store use permission/prohibition information into the secondary storage unit, in step S803, so as to be associated with user identification information and appliance identification information, but this is not limitative. For example, the control unit can be configured to set use permission in use permission/prohibition information that corresponds to a combination of new user identification information and appliance identification information associated with use permission/prohibition information in which use prohibition is set.

This invention is not limited to the above-described embodiments. For example, appliance discard setting information corresponding to a combination of user identification information and appliance identification information can be stored in the secondary storage unit. In that case, the server apparatus can be provided with a unit for changing the appliance discard setting information and a unit for prohibiting use permission/prohibition information, which corresponds to new user identification information and appliance identification information, from being registered for an electronic appliance for which a discard setting has been made. The unit for changing the appliance discard setting information changes the setting of appliance discard setting information in accordance with a user's operation, which is performed through the information processing apparatus set with user identification information, to change whether the electronic appliance should be discarded. With such an arrangement, it is possible to prohibit a third part to use services with use of the electronic appliance discarded by the user and still stored with user identification information for use of the services.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-130166, filed Jun. 7, 2010, which is hereby incorporated by reference herein in its entirety.

What is claimed is:

1. A server apparatus comprising:
a reception unit configured to receive, from an information processing apparatus through a network, pieces of user identification information that uniquely identify respective users, pieces of appliance identification information that uniquely identify respective electronic appliances, and pieces of use permission/prohibition information that represent on a per service type basis whether uses of services are permitted or prohibited;
a storage unit configured to store the pieces of use permission/prohibition information, wherein the pieces of use permission/prohibition information are associated with combinations of user identification information and appliance identification information;
an acceptance unit configured to accept user identification information, appliance identification information, and service type information from any of the electronic appliances through the network;
a determination unit configured to determine whether use of a service represented by the service type information accepted by said acceptance unit is permitted or prohibited based on use permission/prohibition information stored in said storage unit, wherein the use permission/prohibition information is so as to be associated with a combination of the user identification information and the appliance identification information which are accepted by said acceptance unit;
transmission unit configured, in a case where it is determined by said determination unit that use of the service represented by the service type information accepted by said acceptance unit is permitted, to transmit screen information for use of the service represented by the service type information to the electronic appliance; and
a decision unit that makes a decision as to whether use of a service of a new service type represented by the service type information accepted by said acceptance unit is permitted or prohibited based on a number of usable service types and a number of unusable service types among existing service types represented by pieces of use permission/prohibition information already stored in said storage unit, wherein the pieces of use permission/prohibition information are associated with the user identification information and the appliance identification information which are accepted by said acceptance unit,
wherein said storage unit stores use permission/prohibition information representing the decision as to whether use of the service of the new service type is permitted or prohibited, wherein the use permission/prohibition information is associated with the combination of the user identification information and the appliance identification information which are accepted by said acceptance unit.

2. The server apparatus according to claim 1, wherein service types are classified into categories;
said storage unit stores the pieces of use permission/prohibition information on a per category basis;
the server apparatus includes a decision unit that makes a decision as to whether use of a service of a new service type represented by the service type information accepted by said acceptance unit is permitted or prohibited based on pieces of use permission/prohibition information already stored in said storage unit and representing whether uses of services of existing service types classified into a same category as the new service type are permitted or prohibited; and said storage unit stores use permission/prohibition information representing the decision as to whether use of the service of the new service type is permitted or prohibited, wherein the use permission/prohibition information is associated with the combination of the user identification information and the appliance identification information which are accepted by said acceptance unit.

3. The server apparatus according claim 1, including:
a decision unit that makes a decision as to whether use of a service of a new service type represented by the service type information accepted by said acceptance unit is permitted or prohibited based on personal information that includes the user identification information accepted by said acceptance unit,
wherein said storage unit stores use permission/prohibition information representing the decision as to whether use of the service of the new service type is permitted or prohibited, wherein that the use permission/prohibition information is associated with the combination of the user identification information and the appliance identification information which are accepted by said acceptance unit.

4. The server apparatus according to claim 1, wherein service types are classified into categories;
said storage unit stores the pieces of use permission/prohibition information on a per category basis;
the server apparatus includes a decision unit that makes a decision as to whether use of a service of a new service type represented by the service type information accepted by said acceptance unit is permitted or prohibited based on pieces of use history information already stored in said storage unit and representing past results of use of services of existing service types classified into a same category as the new service type; and
said storage unit stores use permission/prohibition information representing the decision as to whether use of the service of the new service type is permitted or prohibited, wherein the use permission/prohibition information is associated with the combination of the user identification information and the appliance identification information which are accepted by said acceptance unit.

5. A control method for a server apparatus, comprising:
a reception step of receiving, from an information processing apparatus through a network, pieces of user identification information that uniquely identify respective users, pieces of appliance identification information that uniquely identify respective electronic appliances, and pieces of use permission/prohibition information that represent on a per service type basis whether uses of services are permitted or prohibited;
a storage step of storing the pieces of use permission/prohibition information, wherein the pieces of use permission/prohibition information are associated with combinations of user identification information and appliance identification information;
an acceptance step of accepting user identification information, appliance identification information, and service type information from any of the electronic appliances through the network;
a determination step of determining whether use of a service represented by the service type information accepted in said acceptance step is permitted or prohibited based on use permission/prohibition information stored in said storage step, wherein the use permission/prohibition information is associated with a combination of the user identification information and the appliance identification information which are accepted in said acceptance step;

transmission step of, in a case where it is determined in said determination step that use of the service represented by the service type information accepted in said acceptance step is permitted, transmitting screen information for use of the service represented by the service type information to the electronic appliance; and a decision step of deciding as to whether use of a service of a new service type represented by the service type information accepted in said acceptance step is permitted or prohibited based on a number of usable service types and a number of unusable service types among existing service types represented by pieces of use permission/prohibition information already stored in said storage step, wherein the user permission/prohibition information is associated with the user identification information and the appliance identification information which are accepted in said acceptance step, wherein said storage step stores use permission/prohibition information representing the decision as to whether use of the service of the new service type is permitted or prohibited, wherein the use permission/prohibition information is associated with the combination of the user identification information and the appliance identification information which are accepted in said acceptance step.

6. A non-transitory computer-readable storage medium storing a program for causing a computer to execute the control method as set forth in claim 5.

7. A server apparatus comprising:

a reception unit configured to receive, from an information processing apparatus through a network, pieces of user identification information that uniquely identify respective users, pieces of appliance identification information that uniquely identify respective electronic appliances, and pieces of use permission/prohibition information that represent on a per service type basis whether uses of services are permitted or prohibited;

a storage unit configured to store the pieces of use permission/prohibition information, wherein the pieces of use permission/prohibition information are associated with combinations of user identification information and appliance identification information;

an acceptance unit configured to accept user identification information, appliance identification information, and service type information from any of the electronic appliances through the network;

a determination unit configured to determine whether use of a service represented by the service type information accepted by said acceptance unit is permitted or prohibited based on use permission/prohibition information stored in said storage unit, wherein the use permission/prohibition information is associated with a combination of the user identification information and the appliance identification information which are accepted by said acceptance unit; and a transmission unit configured, in a case where it is determined by said determination unit that use of the service represented by the service type information accepted by said acceptance unit is permitted, to transmit screen information for use of the service represented by the service type information to the electronic appliance;

wherein:

service types are classified into categories;

said storage unit stores the pieces of use permission/prohibition information on a per category basis;

the server apparatus includes a decision unit that makes a decision as to whether use of a service of a new service type represented by the service type information accepted by said acceptance unit is permitted or prohibited based on pieces of use history information already stored in said storage unit and representing past results of use of services of existing service types classified into a same category as the new service type; and said storage unit stores use permission/prohibition information representing the decision as to whether use of the service of the new service type is permitted or prohibited, wherein the use permission/prohibition information is associated with the combination of the user identification information and the appliance identification information which are accepted by said acceptance unit.

8. The server apparatus according to claim 7, wherein the decision unit makes a decision as to whether use of a service of a new service type represented by the service type information accepted by said acceptance unit is permitted or prohibited based on pieces of use permission/prohibition information already stored in said storage unit and representing whether uses of services of existing service types classified into a same category as the new service type are permitted or prohibited.

9. The server apparatus according claim 7, wherein the decision unit makes a decision as to whether use of a service of a new service type represented by the service type information accepted by said acceptance unit is permitted or prohibited based on personal information that includes the user identification information accepted by said acceptance unit.

10. A control method for a server apparatus, comprising:

a reception step of receiving, from an information processing apparatus through a network, pieces of user identification information that uniquely identify respective users, pieces of appliance identification information that uniquely identify respective electronic appliances, and pieces of use permission/prohibition information that represent on a per service type basis whether uses of services are permitted or prohibited;

a storage step of storing the pieces of use permission/prohibition information, wherein the pieces of use permission/prohibition information are associated with combinations of user identification information and appliance identification information;

an acceptance step of accepting user identification information, appliance identification information, and service type information from any of the electronic appliances through the network;

a determination step of determining whether use of a service represented by the service type information accepted in said acceptance step is permitted or prohibited based on use permission/prohibition information stored in said storage step, wherein the use permission/prohibition information is associated with a combination of the user identification information and the appliance identification information which are accepted in said acceptance step; and a transmission step of, in a case where it is determined in said determination step that use of the service represented by the service type information accepted in said acceptance step is permitted, transmitting screen information for use of the service represented by the service type information to the electronic appliance;

wherein:
service types are classified into categories;
said storage step stores the pieces of use permission/prohibition information on a per category basis;
the method further includes a decision step of deciding as to whether use of a service of a new service type represented by the service type information accepted in said acceptance step is permitted or prohibited based on pieces of use history information already stored in said storage step and representing past results of use of services of existing service types classified into a same category as the new service type; and
said storage step stores use permission/prohibition information representing the decision as to whether use of the service of the new service type is permitted or prohibited, wherein the use permission/prohibition information is associated with the combination of the user identification information and the appliance identification information which are accepted in said acceptance step.

11. A non-transitory computer-readable storage medium storing a program for causing a computer to execute the control method as set forth in claim 10.

12. A server apparatus comprising:
a reception unit configured to receive, from an information processing apparatus through a network, pieces of user identification information that uniquely identify respective users, and pieces of use permission/prohibition information that represent on a per service type basis whether uses of services are permitted or prohibited;
a storage unit configured to store the pieces of use permission/prohibition information, wherein the pieces of use permission/prohibition information are associated with user identification information;
an acceptance unit configured to accept user identification information and service type information from any of the electronic appliances through the network;
a determination unit configured to determine whether use of a service represented by the service type information accepted by said acceptance unit is permitted or prohibited based on use permission/prohibition information stored in said storage unit, wherein the use permission/prohibition information is associated with the user identification information which is accepted by said acceptance unit;
a transmission unit configured, in a case where it is determined by said determination unit that use of the service represented by the service type information accepted by said acceptance unit is permitted, to transmit screen information for use of the service represented by the service type information to the electronic appliance; and
a decision unit that makes a decision as to whether use of a service of a new service type represented by the service type information accepted by said acceptance unit is permitted or prohibited based on a number of usable service types and a number of unusable service types among existing service types represented by pieces of use permission/prohibition information already stored in said storage unit, wherein the pieces of use permission/prohibition information are associated with the user identification information which is accepted by said acceptance unit,
wherein said storage unit stores use permission/prohibition information representing the decision as to whether use of the service of the new service type is permitted or prohibited, wherein the use permission/prohibition information is associated with the combination of the user identification information which is accepted by said acceptance unit.

13. The server apparatus according to claim 12, wherein service types are classified into categories;
said storage unit stores the pieces of use permission/prohibition information on a per category basis;
the server apparatus includes a decision unit that makes a decision as to whether use of a service of a new service type represented by the service type information accepted by said acceptance unit is permitted or prohibited based on pieces of use permission/prohibition information already stored in said storage unit and representing whether uses of services of existing service types classified into a same category as the new service type are permitted or prohibited; and
said storage unit stores use permission/prohibition information representing the decision as to whether use of the service of the new service of the new service type is permitted or prohibited, wherein the use permission/prohibition information is associated with the user identification information which is accepted by said acceptance unit.

14. The server apparatus according claim 12, including:
a decision unit that makes a decision as to whether use of a service of a new service type represented by the service type information accepted by said acceptance unit is permitted or prohibited based on personal information that includes the user identification information accepted by said acceptance unit,
wherein said storage unit stores use permission/prohibition information representing the decision as to whether use of the service of the new service type is permitted or prohibited, wherein the use permission/prohibition information is associated with the user identification information which is accepted by said acceptance unit.

15. The server apparatus according to claim 12, wherein service types are classified into categories;
said storage unit stores the pieces of use permission/prohibition information on a per category basis;
the server apparatus includes a decision unit that makes a decision as to whether use of a service of a new service type represented by the service type information accepted by said acceptance unit is permitted or prohibited based on pieces of use history information already stored in said storage unit and representing past results of use of services of existing service types classified into a same category as the new service type; and
said storage unit stores use permission/prohibition information representing the decision as to whether use of the service of the new service type is permitted or prohibited, wherein the use permission/prohibition information is associated with the user identification information which is accepted by said acceptance unit.

16. A control method for a server apparatus, comprising:
a reception step of receiving, from an information processing apparatus through a network, pieces of user identification information that uniquely identify respective users and pieces of use permission/prohibition information that represent on a per service type basis whether uses of services are permitted or prohibited;
a storage step of storing the pieces of use permission/prohibition information, wherein the pieces of use permission/prohibition information are associated with user identification information;

an acceptance step of accepting user identification information and service type information from any of the electronic appliances through the network;
a determination step of determining whether use of a service represented by the service type information accepted in said acceptance step is permitted or prohibited based on use permission/prohibition information stored in said storage step, wherein the use permission/prohibition information is associated with the user identification information which is accepted in said acceptance step; and
a transmission step of, in a case where it is determined in said determination step that use of the service represented by the service type information accepted in said acceptance step is permitted, transmitting screen information for use of the service represented by the service type information to the electronic appliance; and
a decision step of deciding as to whether use of a service of a new service type represented by the service type information accepted in said acceptance step is permitted or prohibited based on a number of usable service types and a number of unusable service types among existing service types represented by pieces of use permission/prohibition information already stored in said storage step, wherein the user permission/prohibition information is associated with the user identification information which is accepted in said acceptance step,
wherein said storage step stores use permission/prohibition information representing the decision as to whether use of the service of the new service type is permitted or prohibited, wherein the use permission/prohibition information is associated with the combination of the user identification information which is accepted in said acceptance step.

17. A non-transitory computer-readable storage medium storing a program for causing a computer to execute the control method as set forth in claim 16.

18. A server apparatus comprising:
a reception unit configured to receive, from an information processing apparatus through a network, pieces of user identification information that uniquely identify respective users and pieces of use permission/prohibition information that represent on a per service type basis whether uses of services are permitted or prohibited;
a storage unit configured to store the pieces of use permission/prohibition information, wherein the pieces of use permission/prohibition information are associated with user identification information;
an acceptance unit configured to accept user identification information and service type information from any of the electronic appliances through the network;
a determination unit configured to determine whether use of a service represented by the service type information accepted by said acceptance unit is permitted or prohibited based on use permission/prohibition information stored in said storage unit, wherein the use permission/prohibition information is associated with the user identification information which is accepted by said acceptance unit; and
a transmission unit configured, in a case where it is determined by said determination unit that use of the service represented by the service type information accepted by said acceptance unit is permitted, to transmit screen information for use of the service represented by the service type information to the electronic appliance;

wherein:
service types are classified into categories;
said storage unit stores the pieces of use permission/prohibition information on a per category basis;
the server apparatus includes a decision unit that makes a decision as to whether use of a service of a new service type represented by the service type information accepted by said acceptance unit is permitted or prohibited based on pieces of use history information already stored in said storage unit and representing past results of use of services of existing service types classified into a same category as the new service type; and
said storage unit stores use permission/prohibition information representing the decision as to whether use of the service of the new service type is permitted or prohibited, wherein the use permission/prohibition information is associated with the user identification information which is accepted by said acceptance unit.

19. The server apparatus according to claim 18, wherein the decision unit makes a decision as to whether use of a service of a new service type represented by the service type information accepted by said acceptance unit is permitted or prohibited based on pieces of use permission/prohibition information already stored in said storage unit and representing whether uses of services of existing service types classified into a same category as the new service type are permitted or prohibited.

20. The server apparatus according claim 18, wherein the decision unit makes a decision as to whether use of a service of a new service type represented by the service type information accepted by said acceptance unit is permitted or prohibited based on personal information that includes the user identification information accepted by said acceptance unit.

21. A control method for a server apparatus, comprising:
a reception step of receiving, from an information processing apparatus through a network, pieces of user identification information that uniquely identify respective users and pieces of use permission/prohibition information that represent on a per service type basis whether uses of services are permitted or prohibited;
a storage step of storing the pieces of use permission/prohibition information, wherein the pieces of use permission/prohibition information are associated with user identification information;
an acceptance step of accepting user identification information and service type information from any of the electronic appliances through the network;
a determination step of determining whether use of a service represented by the service type information accepted in said acceptance step is permitted or prohibited based on use permission/prohibition information stored in said storage step, wherein the use permission/prohibition information is associated with the user identification information which is accepted in said acceptance step; and
a transmission step of, in a case where it is determined in said determination step that use of the service represented by the service type information accepted in said acceptance step is permitted, transmitting screen information for use of the service represented by the service type information to the electronic appliance;
wherein:
service types are classified into categories;
said storage step stores the pieces of use permission/prohibition information on a per category basis;
the method further includes a decision step of deciding as to whether use of a service of a new service type represented by the service type information accepted in said acceptance step is permitted or prohibited based on pieces of use history information already stored in said storage step and representing past results of use of services of existing service types classified into a same category as the new service type; and said storage step stores use permission/prohibition information representing the decision as to whether use of the service of the new service type is permitted or prohibited, wherein the use permission/prohibition information is associated with the user identification information and the appliance identification information which is accepted in said acceptance step.

22. A non-transitory computer-readable storage medium storing a program for causing a computer to execute the control method as set forth in claim 21.

* * * * *